Oct. 26, 1926.
W. A. COVENTRY
STOVEPIPE DAMPER
Filed Jan. 27, 1926
1,604,219
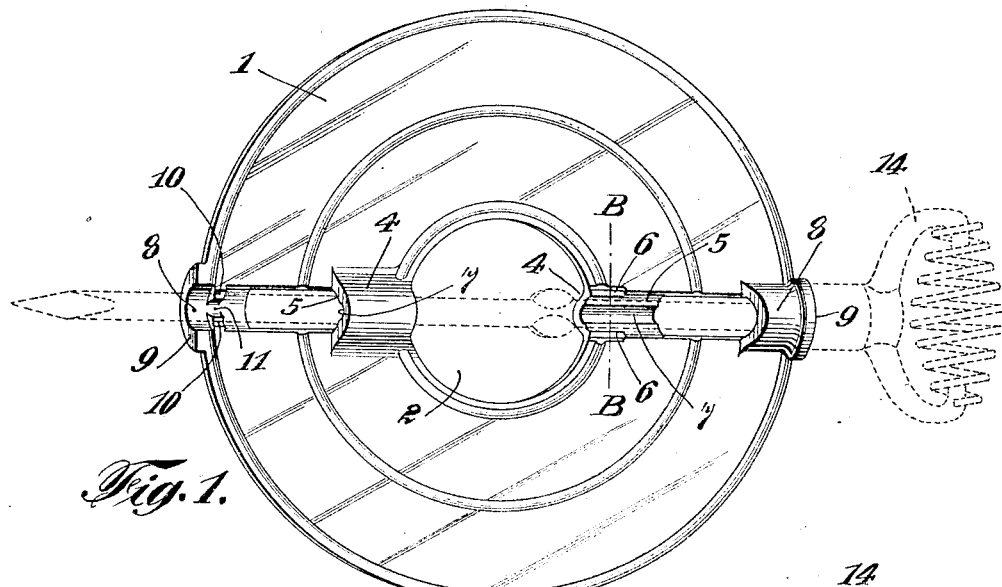
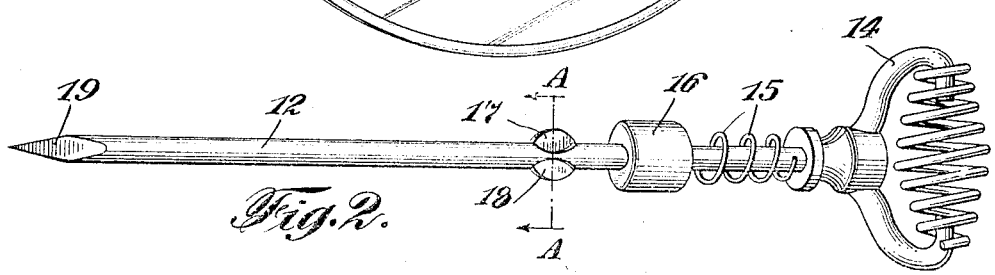
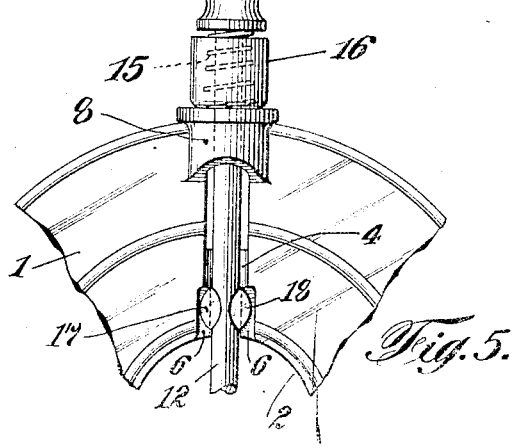
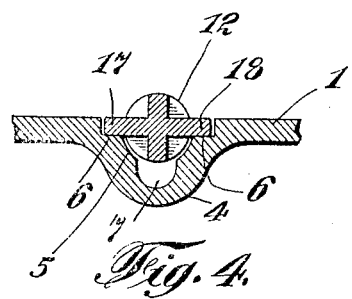
INVENTOR
William A. Coventry
BY
George Ramsey
his ATTORNEY Patented Oct. 26, 1926.

1,604,219

UNITED STATES PATENT OFFICE.

WILLIAM A. COVENTRY, OF LANCASTER, PENNSYLVANIA, ASSIGNOR TO WRIGHTSVILLE HARDWARE COMPANY, OF WRIGHTSVILLE, PENNSYLVANIA, A CORPORATION OF PENNSYLVANIA.

STOVEPIPE DAMPER.

Application filed January 27, 1926. Serial No. 84,038.

This invention relates to stove pipe dampers, and more especially to improvements in reversible types of stove pipe dampers.

The present invention relates more specially to constructions for interlocking the shaft with a stove pipe damper plate in such manner as to secure a strong positive interlock which is constructed to retain the assembled parts efficiently locked together without liability of breakage to the damper plate.

More particularly, the invention comprises a damper shaft to which is cast a handle head and upon which is threaded a spring cup and spring. The damper shaft is then swaged to produce locking projections to interlock with the damper plate and which projections serve to prevent loss of the cup and spring from the shaft during packing or transportation and retain the cup and spring out of the way when the damper shaft is used as a punch to puncture the stove pipe for assembly of the damper and stove pipe.

Another improvement which the present construction brings into the art is the interlock between the damper plate and the shaft being located adjacent the central part of the damper where the greatest strength of the damper plate occurs, and the locking lugs on the sides of the shaft are relatively small so that they do not puncture a large undesirable hole through the side of the stove pipe when the damper is installed.

Other and further objects of the present invention will in part be obvious and will in part be pointed out hereinafter in the specification by reference to the accompanying drawings forming a part thereof.

It is realized that the present invention may be carried out in constructions other than those specifically disclosed herewith and therefore the disclosure is to be understood as illustrative and not in the limiting sense.

Fig. 1 is a perspective view of a damper plate of the preferred form of the invention.

Fig. 2 is a perspective view of the shaft and assembled parts.

Fig. 3 is a sectional view on line A—A, Fig. 2.

Fig. 4 is a detail sectional view on line B—B, Fig. 1.

Fig. 5 is a detail view illustrating a portion of the damper shaft interlocked with the damper plate.

Referring now more specially to the drawings, the damper plate 1 is provided with the usual draught opening 2, and is constructed symmetrically in such manner that each side of the damper plate is a reversed replica of the other side. This facilitates the introduction of a suitable shaft to either side of the damper plate, and obviates the necessity of the user from predetermining which side shall be used to cooperate with the interlock in the damper shaft.

Loops 4 are provided adjacent the draught opening 2 and the plate under each loop 4 is formed with interlock recesses 5 and 6. The mid top portion of each loop is constructed with a groove 7 extending parallel to the axis of the shaft opening. Half sleeves 8 are formed adjacent the edge of the damper plate and are provided with substantially flat ends 9 to form a friction bearing surface against the side wall of a suitable stove pipe. Bearing lugs 10 to support the damper shaft, may be arranged within the half sleeves 9 and with a space 11 between the bearing lugs, which space is diametrically oppositely opposed to the arrangement of the grooves 7 in the loops 4.

The damper shaft comprises a wrought metal shaft 12 which is fixedly mounted in the handle 14 by casting or otherwise. A suitable spring 15 and an enclosing cup 16 comprising a spring support, are loosely fitted over the shaft 12 and then the shaft is swaged on each side to produce interlocking lugs 17 and 18 that are located about two thirds the length of the shaft from the pointed end 19. The opening in the spring support 16 is circular and slightly larger than the diameter of the shaft 12. These lugs having been formed after the cup 16 and spring 15 are in place on the shaft, act as stops which prevent the cup from falling off the shaft when the assembled unit is handled.

To insert the shaft in place, the damper is set in the stove pipe at the desired position and the sharp point 19 of the shaft is driven through the side wall of the stove pipe in such manner as to pass adjacent one of the half sleeves 8 which acts as an anvil to support the stove pipe during the puncturing operation, and the shaft is turned in such position that the lugs and the longitudinal axis of the handle are at right angles to the plane of the damper plate. The rounded advancing edge of the lugs permit an easy passage of the same through the opening in the pipe made by the sharp point, and the shaft is now inserted through the loops on the damper plate until the sharp point extends through the opposite side of the pipe. The positioning of the shaft permits the lugs 17 and 18 to pass through the space 11 between the bearing surfaces 10 and also to pass through the groove 7 until the lugs reach the draught opening 2. At this time, the spring 15 has been considerably compressed in the cup 16. The shaft is now turned with the handle parallel to the plane of the damper plate and pressure is released. This brings the lugs on the shaft in position to enter the recesses 5 and 6. The spring 15 expands and draws the interlocking lugs 17 and 18 into position over the interlocking recesses 5 and 6 thereby securely locking the shaft to the damper plate before the spring 15 is completely relieved of its compression, thereby permitting the cup to bear against the side wall of the damper plate and act as a friction brake to retain the damper in set positions within the stove pipe. It will be observed that the interlock between the shaft and the damper plate is constructed to be effective adjacent the innermost part of the damper which is the strongest part of the plate and thus be able to withstand heavy twisting forces without danger of breaking or cracking the damper plate. It is not unusual for stove pipes to become filled with soot, or the like, so that considerable effort is required to turn the damper and where interlocks are merely of the spring pressed type, there is great liability of the shaft turning in the damper plate. On the other hand, where positive interlocks are provided adjacent the edge of the damper plate, the liability of cracking the plate or breaking out the interlocking portion is much greater than is the case in the present construction where the interlocks are provided adjacent the inner portion of the damper plate. A further advantage obtained by this construction is that it is unnecessary to weaken the plate by providing an opening through which the interlocking lugs may turn, since in accordance with the present invention the lugs are pushed into the draught opening 2, which necessarily must be present, and are therein rotated to position the interlock with the damper plate.

Having described my invention, what I claim is:—

1. In a stove pipe damper, a reversible damper plate provided with a draft opening and with interlocking surfaces on the damper plate symmetically arranged in pairs on each side of the draft opening, in combination with a shaft adapted to enter said reversible damper plate from either side, said shaft being provided with a single pair of lugs symmetically located on diametrically opposite sides of the shaft and remote from the portion of the shaft adjacent the edge of the damper plate when the shaft is locked to the plate, and spring means carried by one end of said shaft and tending to move said shaft endwise to normally retain said lugs in engagement with said interlocking surfaces to securely lock said shaft and damper plate together.

2. In a stove pipe damper, a reversible damper plate provided with a draft opening and with interlocking surfaces on the damper plate symmetically arranged in pairs on each side of the draft opening, said damper plate having symmetrical half sleeves at each edge of the plate, each half sleeve comprising a support for a damper shaft and being provided with a groove to permit the passage of a shaft lug therethrough, in combination with a shaft adapted to enter said reversible damper plate from either side, said shaft being provided with a single pair of lugs symmetically located on diametrically opposite sides of the shaft and remote from the portion of the shaft adjacent the edge of the damper plate when the shaft is locked to the plate, and spring means carried by one end of said shaft and tending to move said shaft endwise to normally retain said lugs in engagement with said interlocking surfaces to securely lock said shaft and damper plate together.

3. In a stove pipe damper, a reversible damper plate provided with a draft opening and with interlocking surfaces on the damper plate symmetically arranged in pairs on each side of the draft opening, said damper plate having symmetrical half sleeves at each edge of the plate, each half sleeve comprising a support for a damper shaft and being provided with a groove to permit the passage of a shaft lug therethrough, a loop on each side of the draft opening and also comprising a support for a shaft, in combination with a shaft adapted to enter said reversible damper plate from either side, said shaft being provided with a single pair of lugs symmetrically located on diametrically opposite sides of the shaft and remote from the portion of the shaft adjacent the edge of the damper plate when the shaft is locked to the plate, and spring means carried by one end of said shaft and tending to move said shaft endwise to normally retain said lugs in engagement with said interlocking surfaces to securely lock said shaft and damper plate together.

4. An article of manufacture comprising a damper shaft of cylindrical metal and having a pointed end, a handle secured to one end of said shaft, a spring support having a circular opening therein slightly larger than the diameter of the shaft, and a projection on said shaft between the pointed end of said shaft and said spring support and comprising a stop to prevent the said spring support and the said spring from being disengaged from the pointed end of said shaft, the handle preventing the disengagement of the said spring support and said spring from the other end of said shaft.

WILLIAM A. COVENTRY.